United States Patent [19]

Miller

[11] 4,428,281

[45] Jan. 31, 1984

[54] COOKING GRILL

[76] Inventor: R. J. Miller, 1101 W. Breen Ave., Kingsford, Mich. 49801

[21] Appl. No.: 376,643

[22] Filed: May 10, 1982

[51] Int. Cl.³ .............................................. A47J 37/00
[52] U.S. Cl. ....................................... 99/445; 99/446; 99/450
[58] Field of Search ................. 99/450, 444, 445, 425, 99/446; D7/359, 388, 408, 409

[56] References Cited

U.S. PATENT DOCUMENTS

| | | |
|---|---|---|
| 141,370 | 5/1945 | Hufford et al. . |
| 151,344 | 10/1948 | Hathaway . |
| 243,436 | 2/1977 | Vida . |
| 246,751 | 12/1977 | Yonkers . |
| 246,883 | 1/1978 | Di Ruscio . |
| 1,216,973 | 2/1917 | Epprecht . |
| 1,451,971 | 8/1923 | Tocchio . |
| 1,962,908 | 6/1934 | Pierson . |
| 2,477,721 | 8/1949 | Chesser et al. ........................ 99/391 |
| 2,639,659 | 5/1953 | Fry ........................................ 99/393 |
| 2,816,538 | 12/1957 | Miller et al. ........................... 126/25 |
| 2,849,949 | 9/1958 | Trachtman ............................ 99/425 |
| 2,908,214 | 10/1959 | Persinger .............................. 99/445 |
| 3,199,438 | 8/1965 | Myler et al. .......................... 99/421 |
| 3,288,050 | 11/1966 | Saiki .................................. 99/445 X |
| 3,369,481 | 2/1968 | Pappas ............................... 99/446 X |
| 3,422,746 | 1/1969 | Sheinker ............................... 99/445 |
| 3,722,402 | 3/1973 | Plumley ............................... 99/450 |
| 3,753,396 | 8/1973 | Koziol .................................. 99/450 |
| 3,842,726 | 10/1974 | Fautz .................................... 99/425 |
| 3,937,138 | 2/1976 | Tidwell ................................. 99/450 |
| 3,946,651 | 3/1976 | Garcia .................................. 99/444 |
| 4,034,662 | 7/1976 | McLane ................................ 99/445 |

FOREIGN PATENT DOCUMENTS

| | | | |
|---|---|---|---|
| 166128 | 9/1904 | Fed. Rep. of Germany . | |
| 34940 | 7/1905 | Switzerland . | |
| 169123 | 9/1921 | United Kingdom ................. 99/444 |
| 510645 | 8/1939 | United Kingdom ................. 99/444 |

*Primary Examiner*—Billy J. Wilhite

[57] ABSTRACT

A grill, such as for use in barbecues, comprising a flat cooking surface having a multiplicity of openings therethrough and grooves inlaid therein which are juxtaposed so as to effect the flowing of a major portion of the liquids emanating from food being cooked on the cooking surface into the grooves and a minor portion of the liquids into the openings. The minor portion falls into the heat source located underneath the grill. The grooves are of a slope and direction to effect the disposition of the major portion of liquids to a location distant from the heat source.

7 Claims, 3 Drawing Figures

COOKING GRILL

BACKGROUND OF THE INVENTION

1. Field of the Invention

The present invention relates to cooking grills and more particularly cooking grills having a top surface upon which food may be cooked with a heat source located beneath the grill.

2. Description of the Prior Art

There is a wealth of art relating to the very old, probably ancient, concept of grilling food, particularly meat, on a grill which supports the food being cooked over a heat source and which allows the food to be directly or indirectly exposed to the heat. There are generally two types of grills, one having an imperforate cooking surface and the other having perforations or openings in the cooking surface to allow direct exposure of the food to the heat source. Examples of the former would be the common frying pan or griddle as well as the devices described in U.S. Pat. Nos. 1,216,973 to Epprecht; 1,962,908 to Pierson; 2,639,659 to Fry; 2,849,949 to Trachtman; and 3,842,726 to Fantz. Examples of the latter type of grill are the common wire mesh or cast metal type grills such as those shown in U.S. Pat. Nos. 1,451,971 to Tocchio; 2,477,721 to Chesser et al; 2,816,538 to Miller et al; 3,199,438 to Myler et al; 3,753,396 to Koziol; 3,937,138 to Tidwell; 3,946,651 to Garcia; 4,034,662 to McLane; 141,370 (Des.) to Hufford et al; 151,344 (Des.) to Hathaway; 243,436 (Des.) to Vide; 246,883 (Des.) to DiRuscio; German Pat. No. 166,128 and Swiss Pat. No. 34940.

The above references all show different cooking surface configurations for both perforate and imperforate grills. Among the perforate type there are some with flat cooking surfaces and uniformly distributed openings, such as the devices of U.S. Pat. Nos. 2,816,538; 3,753,396; 3,937,138; and 246,883 (Des.). Among the imperforate type there are some with flat cooking surfaces with grooves or channels to draw off the juices such as the devices of U.S. Pat. Nos. 1,962,908; and 3,842,726.

I have discovered a unique configuration of perforate cooking grill with flat cooking surface and grooves for drawing off cooking liquids that is particularly suitable for use with the heat source underneath the grill.

SUMMARY OF THE INVENTION

The primary embodiment of my invention comprises a cooking grill comprising a flat cooking surface having a multiplicity of uniformly distributed openings therethrough and a multiplicity of grooves inlaid therein. The openings and grooves are juxtaposed so as to effect the flowing of a major portion of liquids emanating from food being cooked on the cooking surface into the grooves and a minor portion of the liquids into the openings through which the minor portion falls into a heat source underneath the grill. The grooves are of a slope and direction to effect the disposition of the major portion of the liquids to a location distant from the heat source.

Other embodiments of my invention encompass details as to the shape and structure of the grill and the relationship between the openings and grooves, all of which will hereinafter be discussed in greater detail.

DETAILED DESCRIPTION OF THE INVENTION

Although, as mentioned above, the concept of cooking devices comprising an open or perforated grill having a heat source underneath and a top surface for supporting the food to be cooked is ancient, these devices are today in very wide use. Not only are such devices common to commercial establishments such as restaurants, but are also to be found in almost every home for family use in one form or another and commonly referred to as the "barbecue grill". The popularity of these devices is no passing fad but is soundly based on the fact that food, particularly meats, when grilled over and directly exposed to the heat source achieves a characteristic and much sought after flavor, frequently referred to as "barbecue flavor". This flavor is derived in some instances to some extent from gases or smoke emanating from the heat source itself which come into contact with the food, but to a much greater extent, and exclusively when the heat source comprises heated rock, (e.g. lava rock heated by natural gas) by the smoke and vapors caused by liquids, particularly fats, from the cooking food itself falling into the heat source.

The above discussed prior art cooking grills suffer many disadvantages. Those grills that are imperforate are, of course, unable to provide a barbecue flavor. Grills that have openings, such as wire mesh or slotted castings, allow all of the food liquids, including juices and fats, to fall into the heat source. The latter situation causes the dreaded and dangerous "flare up" resulting from highly combustible grease being vaporized in air to form a flammable sometimes explosive mixture. The food in such situations will tend to burn or dry out and sometimes even become coated with ash carried up from the heat source by the violently vaporizing or exploding liquids.

The cooking grill of the present invention achieves a perfect balance between the imperforate grill with which flare-ups would, of course, not occur, but which also cannot provide the barbecue flavor, and the open grill which allows all of the cooking food liquids to fall into the heat source resulting in violent flare-ups. The present invention also provides a flat cooking surface which is conducive to relatively easy cleaning, as compared to wire mesh or rounded surfaces, by scouring or scraping with a sharp-edged instrument. Reference to the attached drawings will make clear how the unique structure of the cooking grill of the present invention enables such desirable characteristics to be obtained.

Figure 1:
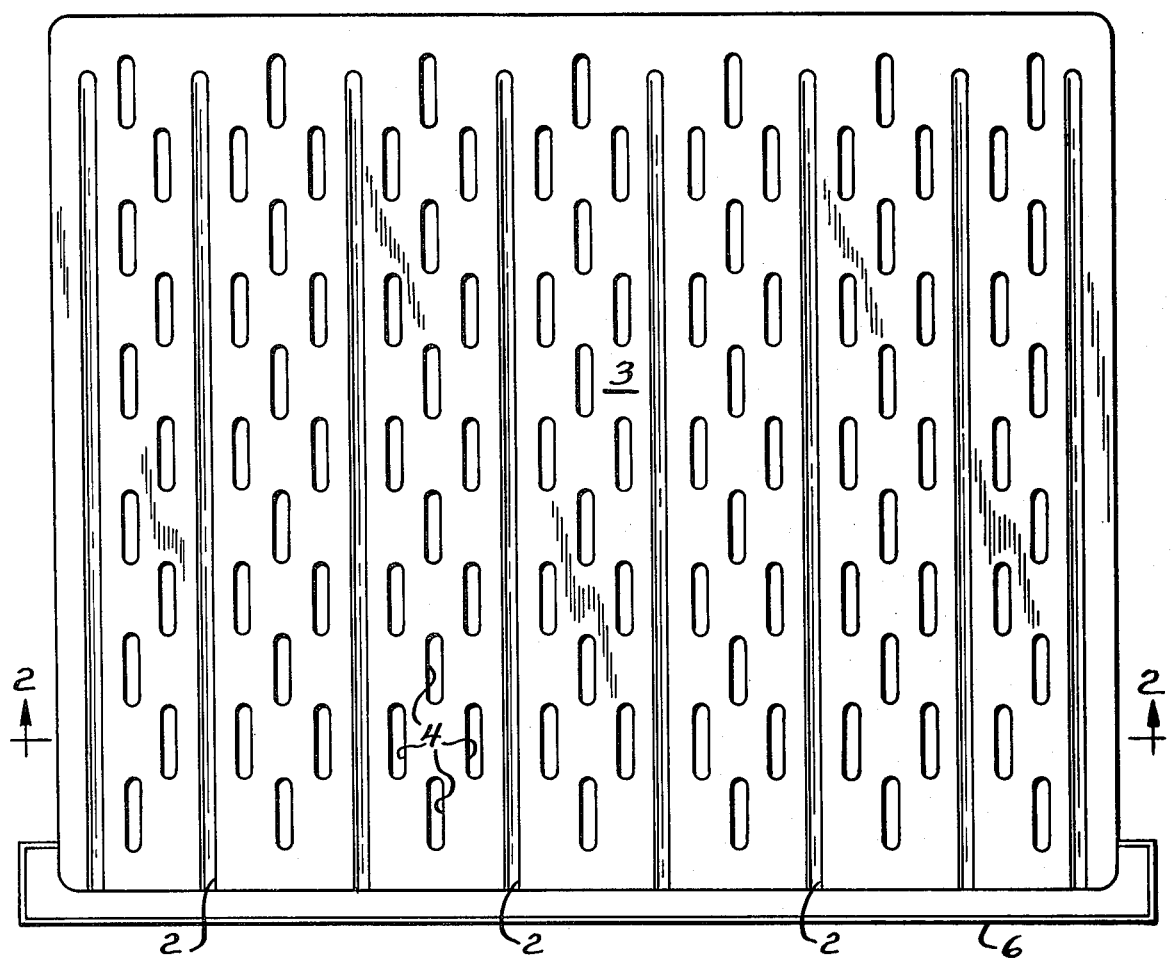
FIG. 1 is a top view of the cooking grill of the present invention.
Figure 2:
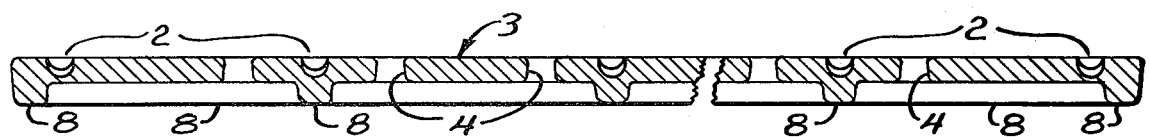
FIG. 2 is a cross-sectional view taken along lines 2-2 in FIG. 1.

With reference to FIG. 1 and FIG. 2, there is shown the flat cooking surface 3, of one embodiment of the present invention, that in which the grooves 2 for drawing off the liquids from the cooking foods are parallel and slope downwardly in the same direction, each adjacent pair of grooves having between them a multiplicity of openings 4. The openings are shown as elongated slots, but might be circular or any other appropriate shape. The openings are said to be uniformly distributed on the grill surface and between the grooves which means they are evenly spaced and form an ascertainable pattern such as the pattern shown on surface 3. The shape of the grill in the figures is rectangular with one pair of parallel edges being parallel to the grooves. The grooves are shown opening into a common location which would cause a major portion of the liquids to flow and be disposed of distant from the heat source. The common location might comprise a removable collecting means, or grease trap, such as trough 6 located below the grill as shown, in which a substantial amount of the liquids may accumulate, thereby enabling the convenient disposal of liquids from time to time as required.

The pattern, shapes, and relative sizes of openings and grooves shown in FIG. 1 are illustrative of a particularly preferred embodiment which is known to achieve the goal of the present invention of only a minor portion of the liquids from the cooking food falling through the openings and into the heat source located below the grill with the major portion flowing into the grooves and thereby to the common collecting location. By "major portion" it is meant at least in excess of 50%, while, conversely, "minor portion" would mean something less than 50%. Whether a particular configuration of openings, grooves, and flat surface will achieve this desirable split and disposition of liquids is largely an empirical determination. The flat surface provides the additional advantage of being the only part of the grill with which the food will come into contact and thereby receive the worst of the tenaciously adhering food residues which can be relatively easily cleaned from the flat surface by scouring or scraping.

With only a minor portion of liquids from the cooking food falling into the heat source, the problem of flare-ups will be eliminated or at least minimized. At the same time, this minor portion will be quite adequate to cause the generation of sufficient smoke and vapors to rise upward and back through the openings to come in contact with and flavor the food.

The cooking grill of the present invention would most likely be a metal casting, such as aluminum, the top surface of which would comprise the flat cooking surface. With reference to FIG. 2, the bottom surface of the grill may have ribbing 8 integrally cast therewith for structural rigidity thereby precluding warping of the grill during the likely occurrence of extreme or unevenly distributed temperatures in the grill. With the ribbing to provide structural strength, the thickness of the grill through cooking surface 3 may be very thin thus making for a light casting with openings 4 of slight depth and conducive to easy cleaning. All edges of the casting should be rounded to prevent injury to the surfaces of sinks in which the grill might be cleaned. Also shown in FIG. 2 are grooves 2 which are shown preferably over and along the length of the ribs on the side of the grill opposite the ribs so as not to compromise the strength of the casting.

The cooking grill shown in the figures is of a rectangular shape with a portion of the ribbing comprising four intersecting perimeter ribs along the perimeter of the bottom surface and the remainder of the ribbing comprising parallel evenly spaced ribs parallel to one pair of parallel perimeter ribs and intersecting the other pair of perimeter ribs. The shape of the grill might also be circular and thus suitable for use in the "kettle" type barbecues, with openings, grooves, and underside ribbing as appropriate to achieve the objectives of the invention with regard to the disposition of the major and minor portions of the liquids from the cooking food and the maintaining of structural rigidity of the grill.

Figure 3:
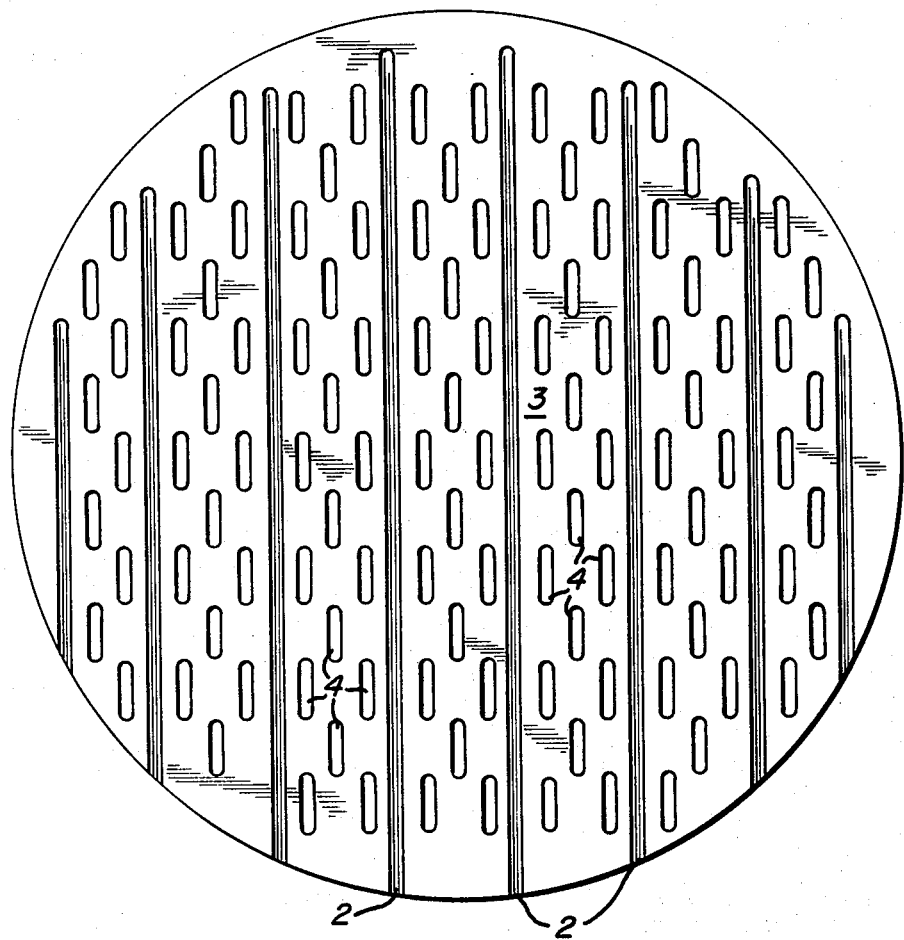
FIG. 3 is a top view of a circular cooking grill of the present invention.

FIG. 3 shows the circular grill with grooves 2 and multiplicity of openings 4.

I claim as my invention:

1. A cooking grill comprising a flat level cooking surface having a multiplicity of uniformly distributed openings therethrough and a multiplicity of grooves inlaid therein, said openings and grooves being juxtaposed so as to effect the flowing of a major portion of liquids eminating from food being cooked on said cooking surface into said grooves and a minor portion of said liquids into said openings through which said minor portion falls into a heat source underneath said grill, said grooves being of a downward slope and direction to effect the disposition of said major portions of said liquids to a location distant from said heat source.

2. The cooking grill of claim 1 wherein said grooves are parallel.

3. The cooking grill of claim 2 wherein the shape of said grill is rectangular, said grooves being parallel to one parallel pair of edges of said grill.

4. The cooking grill of claim 2 wherein said common location into which said major portion of said liquids flows comprises a removable collecting means in which a substantial quantity of said liquids may accumulate, thereby enabling the convenient disposal of said liquids from time to time as required.

5. The cooking grill of claim 1 wherein said grill comprises a metal casting the top surface of which comprises said flat cooking surface and the bottom surface of which has ribbing integrally cast therewith for structural rigidity, thereby precluding warping of said grill during the likely occurrence of extreme or unevenly distributed temperatures in said grill.

6. The cooking grill of claim 5 wherein said grill is of a rectangular shape with a portion of said ribbing comprising four intersecting perimeter ribs along the perimeter of said bottom surface and the remainder of the ribbing comprising parallel evenly spaced ribs parallel to one pair of parallel perimeter ribs and intersecting the other pair of parallel perimeter ribs.

7. The cooking grill of claim 1 wherein the shape of said grill is circular.

* * * * *